United States Patent [19]
Droulon et al.

[11] Patent Number: 5,536,217
[45] Date of Patent: Jul. 16, 1996

[54] CLEARANCE TAKE-UP ARTICULATION USED IN AUTOMOBILE SEATS

[75] Inventors: Georges Droulon, St. Georges des Groseillers; François Baloche, Flers, both of France

[73] Assignee: Bertrand Faure Automobile "BFA", Flers, France

[21] Appl. No.: 258,200

[22] Filed: Jun. 10, 1994

[30] Foreign Application Priority Data

Jun. 11, 1993 [FR] France .................................. 93 07044

[51] Int. Cl.$^6$ ............................. F16H 1/32; B60N 2/02; A47C 1/025
[52] U.S. Cl. .......................................... 475/177; 297/362
[58] Field of Search ........................... 297/362; 475/162, 475/176, 177

[56] References Cited

U.S. PATENT DOCUMENTS

| | | | |
|---|---|---|---|
| 4,371,207 | 2/1983 | Wilking et al. ............... | 297/362 X |
| 5,096,261 | 3/1992 | Baloche ......................... | 297/362 |
| 5,154,475 | 10/1992 | Kafitz ............................ | 297/362 |
| 5,277,672 | 1/1994 | Droulon et al. ................ | 475/176 |

FOREIGN PATENT DOCUMENTS

| | | | |
|---|---|---|---|
| 0340118 | 2/1989 | European Pat. Off. | B60N 1/06 |
| 0505229 | 3/1992 | European Pat. Off. | B60N 2/22 |
| 2627437 | 2/1988 | France | B60N 1/06 |
| 3419492 | 11/1985 | Germany | A47C 1/025 |
| 8002677 | 12/1980 | WIPO | B60N 1/06 |

*Primary Examiner*—Charles A. Marmor
*Assistant Examiner*—Nathan O. Jensen
*Attorney, Agent, or Firm*—Ralph H. Dougherty

[57] ABSTRACT

An articulation used in automobile seats, comprising: a mobile flange having a mobile flange inner toothing; a double satellite; a fixed flange having a fixed flange inner toothing for cooperating with said double satellite, the toothings of which mesh on one side with the fixed flange inner toothing of the fixed flange, and on another side with the mobile flange inner toothing of the mobile flange; an eccentric acting on the double satellite; a driving axis of the eccentric provided with at least one snug, the eccentric being made of two discs angularly mobile with respect to one another, each disc having an arched window; and a resilient element, said discs being connected to one another by said resilient element housed in said arched windows, while a central portion of each of said discs is formed with at least one circular recess, extended by a hollow housing adapted for receiving one of said snugs, and wherein each disc is noncircular and housed inside a bore of the double satellite; the two discs, when in a position spaced apart from one another, ensuring a clearance take-up and also an irreversibility of the articulation.

9 Claims, 4 Drawing Sheets

CLEARANCE TAKE-UP ARTICULATION USED IN AUTOMOBILE SEATS

FIELD OF THE INVENTION

The invention relates to a clearance take-up articulation used in automobile seats.

BACKGROUND OF THE INVENTION

The of the present invention relates to an articulation used in automobile seats, notably for setting the inclination of the seat-back or ensuring a stable position for the seat as such, or for setting the inclination of the seat head-rest placed atop the seat-back.

Articulations incorporated in vehicle seats in view of the hereabove exposed objectives are already known, the driving of which is done either via a satellite or directly on the mobile flange, these articulations including two half-cams pressed back by a central resilient member.

Such an articulation is disclosed in particular in document FR-A-2 649 050 in which the driving is done via a satellite, and a similar articulation is also described in document FR-A-2 479 885, in which the driving is applied directly on the mobile flange.

However, these last solutions do not provide for the irreversibility of the articulation, but only for the clearance take-up.

There is also known from DE-A-3 419 492 an articulation including flanges, with or without satellites, provided with conical toothings pressed by an axially actuating spring allowing taking up the clearance between the toothings.

This articulation includes also a driving cam composed of two circular discs spaced apart from one another by a spring, in order to take up only the bearing clearances.

An object of the present invention is avoid using costly conical toothings, and to take up the toothings clearance via the two cam discs, while ensuring also the take-up of the bearing clearance and the irreversibility of the articulation.

SUMMARY OF THE INVENTION

According to the invention, the articulation includes a fixed flange having an inner toothing for cooperating either with a double satellite the toothings of which mesh on one side with the fixed flange toothings and on the other side with the inner toothing of a mobile flange, or directly with the inner toothing of the mobile flange, an eccentric acting either on the satellite or directly on the mobile flange, a driving axis for the eccentric provided with at least one snug, the eccentric being made of two discs angularly mobile with respect to one another and connected to one another by a resilient element housed in two arched windows, while the central portion of these discs is each formed with at least one circular recess, extended by a hollow housing adapted for receiving the driving axis snug, this articulation being characterized in that each disc is non circular and housed inside a bore of the satellite or of the mobile flange, the two discs, when in a position spaced apart from one another, ensuring the clearance take-up and the irreversibility of the articulation.

According to another feature of the invention for ensuring the control of the articulation, the two hollow housings of the discs are angularly offset when the two discs are in a position where they are spaced apart from one another, in order that the snug acts first on one disc for unblocking the eccentric, then on the two simultaneously.

According to another feature of the invention and in order to guarantee the action of the spring, each arched window includes, at one end, a recess providing the spring with a bearing surface on a single arched opening.

According to another feature of the invention, the articulation is characterized in that the connection between the fixed flange and the mobile flange is provided via a crimped ring with interposition of a crown made of balls between this ring and the mobile flange.

Various other features of the invention will become more apparent from the detailed following description.

BRIEF DESCRIPTION OF THE DRAWINGS

Embodiments of the object of the invention are shown by way of non limiting examples in the accompanying drawings. In particular, all the articulations such as those described hereafter are articulations including a satellite, but of course the eccentric could also act directly on the mobile flange.

DETAILED DESCRIPTION OF THE INVENTION

Figure 1:
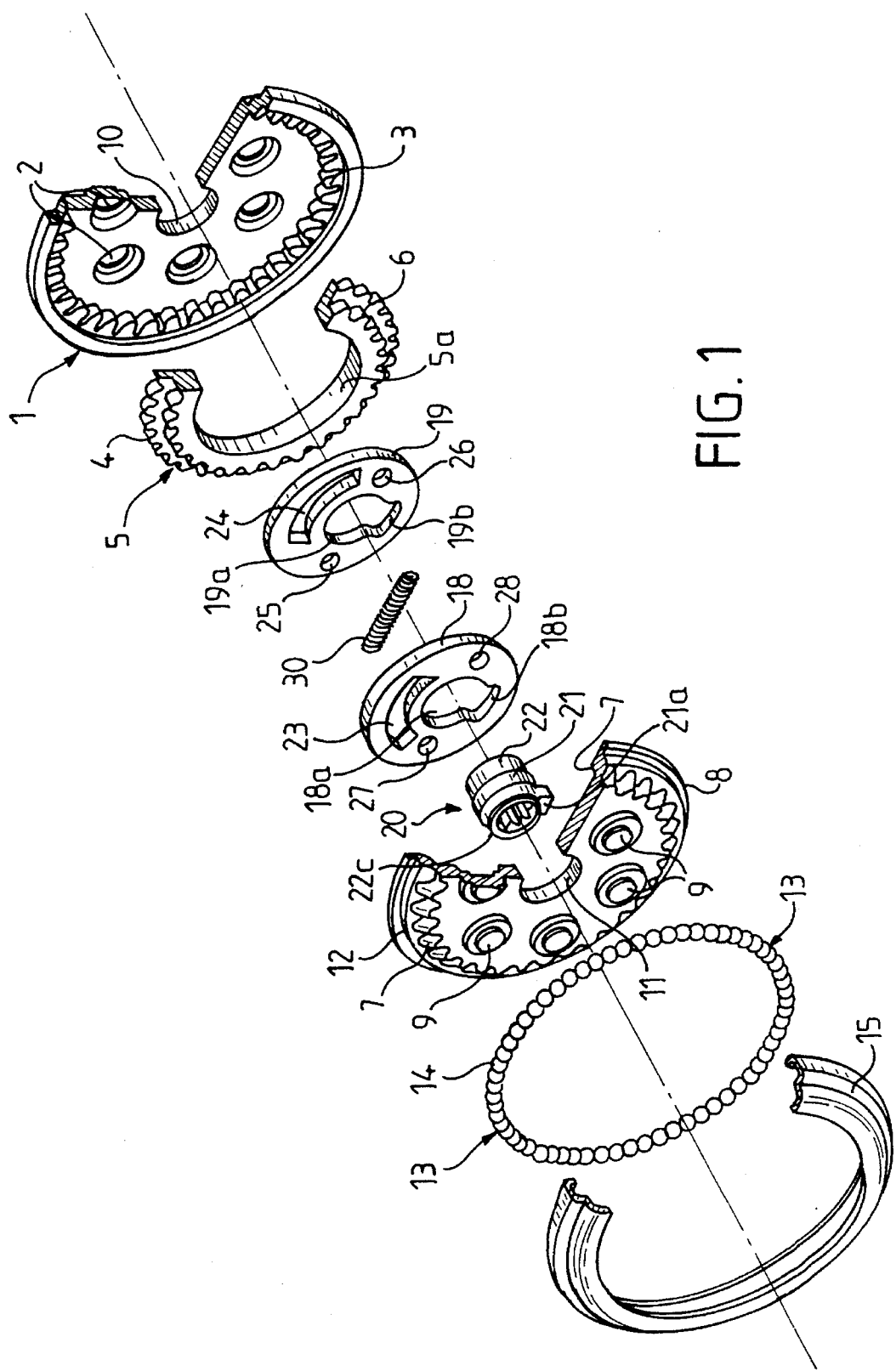
FIG. 1 is an exploded view in perspective of a first embodiment of the articulation.

In FIG. 1, the articulation is made mainly of a fixed flange 1 which is connected to the framework of the seat by fixation members of any kind connected for example by welding to protrusions 2 semi-cut in the bottom of the flange. The latter includes inside a toothing 3 adapted for cooperating with a toothing 4 of a satellite 5 the second toothing 6 of which meshes partially with the toothing 7 of the mobile flange 8. The latter is made rigid with the seat-back framework via protrusions 9.

The central portion of the fixed flange 1 is formed with a channel 10 corresponding to the central channel 11 of the mobile flange 8.

Figure 2:
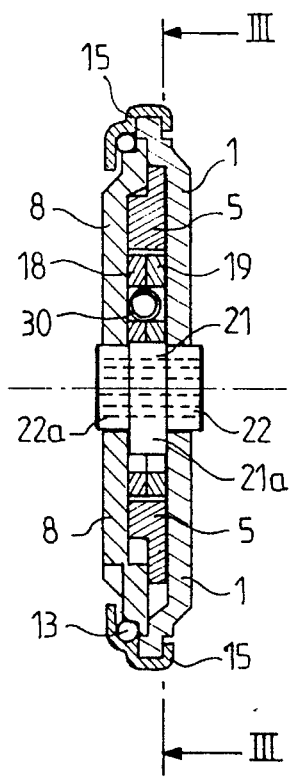
FIG. 2 is a diametrical sectional view of the articulation of FIG. 1.

As shown particularly clearly in FIGS. 1 and 2, the outer periphery 12 of the mobile flange 8 receives a crown 13 made of balls 14, and the connexion between the fixed flange 1 and the mobile flange 8 is provided by a crimped ring 15 (see FIGS. 1 and 2).

Two discs 18, 19 are placed inside the recessed portion 5a of satellite 5 and are mounted on an axis 20 including a central bearing surface 21 of large diameter formed with a snug 21a, while the two other ends of axis 20 are made of cylindrical extensions 22, 22a having a diameter equal to the diameter of channels 10, 11 formed in the fixed and mobile flanges 1 and 8.

Figure 3:
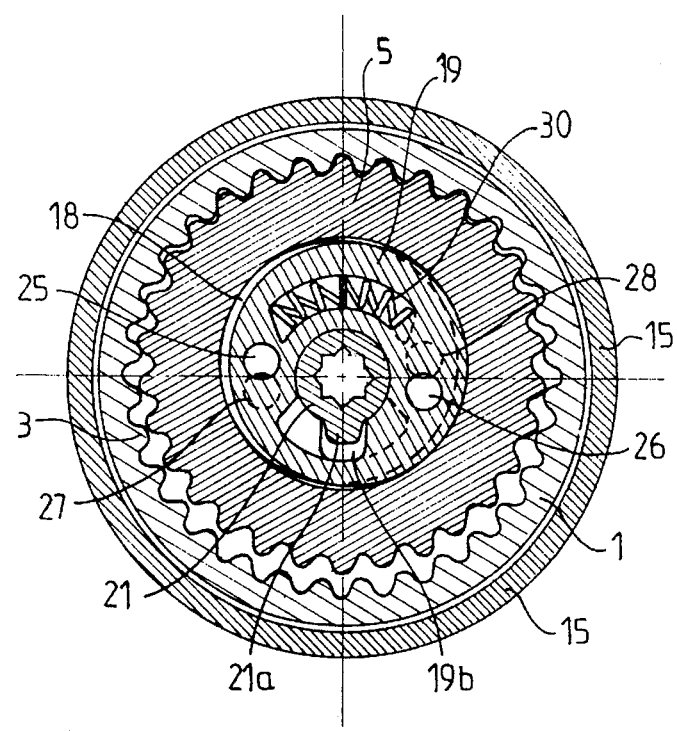
FIG. 3 is a sectional view along line III—III of FIG. 2.
Figure 4:
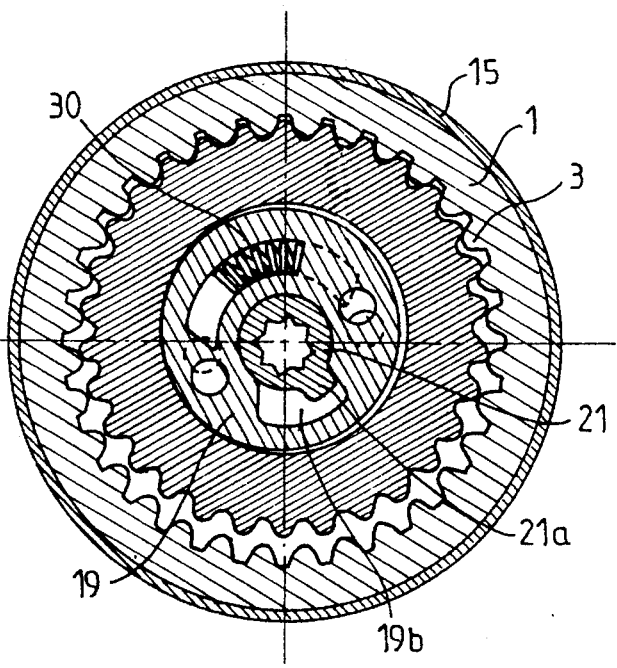
FIG. 4 shows the articulation of FIG. 3 in a driving position of the satellite.

The discs 18, 19 placed in the recessed portion 5a of satellite 5 have the same outer non circular shape, as shown in FIG. 4. In fact, in this figure, one sees clearly that the central bore 5a of the satellite is circular, while the superimposed discs have identical shapes and do not fill completely the central bore of the satellite. In FIG. 3 which is enlarged in 3A, one sees that the discs, in a non setting position, are spaced apart from one another in order to form together almost a full circle occupying practically the whole central bore of the satellite. Disc 19 is offset to the right while disc 18 is offset to the left. Moreover, the central recess 18a is extended in its lower portion by a hollow housing 18b, and the central recess 19a by a hollow housing 19b, these two housings being equally offset, one 18b to the right and the other 19b of the left.

Each disc includes also an arched window 23 for the disc 18, and 24 for the disc 19. These arched windows are concentric to the central axis of each one of the discs. One end of window 23 includes a recess 23a while the opposite end of window 24 includes a recess 24a. The two recesses 23a and 24a allow one end of the spring to bear on one disc, but not on the other, and the other end of the spring to bear on the other disc.

Figure 3A:
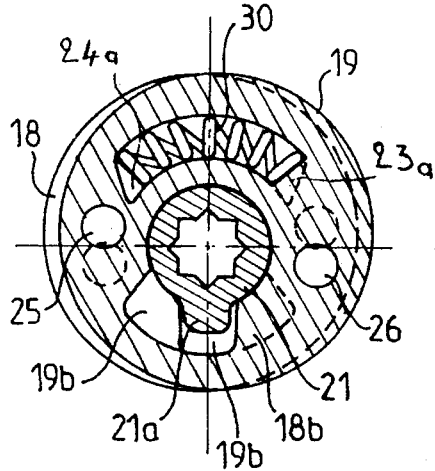
FIG. 3A is a partial view of FIG. 3 at a larger scale, showing frontwardly and in a non-setting position the eccentric or cam discs.

It should be noted that each disc includes holes 25, 26 for disc 19, and 27, 28 for disc 18, these holes being geometrically opposite two by two, but slightly angularly offset for each disc (see FIG. 3A).

Finally, 30 designates a resilient member adapted for being housed in the arched windows 23, 24 of discs 18, 19, when they are coupled to one another on the central bearing surface 21 of axis 20. This resilient member 30 can be for example either a spring (FIGS. 1, 2, 3 and 4) or a resilient block (FIGS. 5, 6, 7, 8, 9, 10 and 11).

When in a non setting position, the mechanism members occupy the position shown in FIGS. 3 and 3A. The snug occupies a central position and the two discs are then spaced apart from one another. As the outer shape of the discs is non circular, they have a tendency to push back the satellite upwardly, that is to push back the toothings 4 and 6 of the satellite 5 against the toothing of one of the flanges, either fixed 1 or mobile 8. They also tend to block the satellite in rotation.

When one wishes to modify the position either with the assistance of a manual control or with the assistance of a motor, generally electric, the rotation of axis 20 causes the angular rotation of snug 21a which first displaces disc 19 and then disc 18, the discs 18, 19 being then in register, that is practically superimposed. This causes an over-compression of spring 30 which, at the start, is already compressed.

In this confined position of the discs 18, 19, it is then possible to drive them simultaneously, thereby forming a cam which, by rotating inside the recessed portion 5a of satellite 5, causes the rotation of the latter. The toothing 4, by rolling inside toothing 3 of the fixed flange 1, causes the rotation of the toothing 6 of satellite 5 by driving the mobile flange 8 via toothing 7, in a manner known per se for all the double satellite articulation mechanisms.

When the position required for the articulation is reached, the rotation of axis 20 is stopped and at that moment the snug resumes its central position, and under the effect of the stretched spring 30 the discs 18, 19 move away from one another. Thus is obtained a blockage of the satellite toothings in the bottom of the toothings of one of the flanges, either fixed 1 or mobile 8, thereby taking up the clearance which can exist due to the irregularities of these toothings when they are being cut.

There is also obtained a blockage in rotation of the satellite by the eccentric, which provides for the irreversibility of the articulation.

Whatever the direction of rotation of axis, 20, the same operation takes place at times in the clockwise direction and at times in the counter-clockwise direction.

Figure 5:
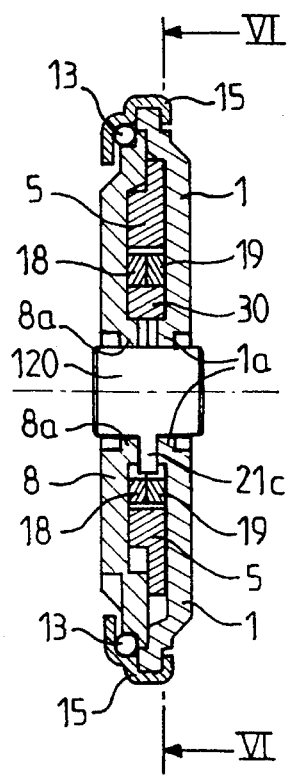
FIG. 5 is a diametrical sectional view of an alternative embodiment of the articulation mechanism, according to the invention.
Figure 6:
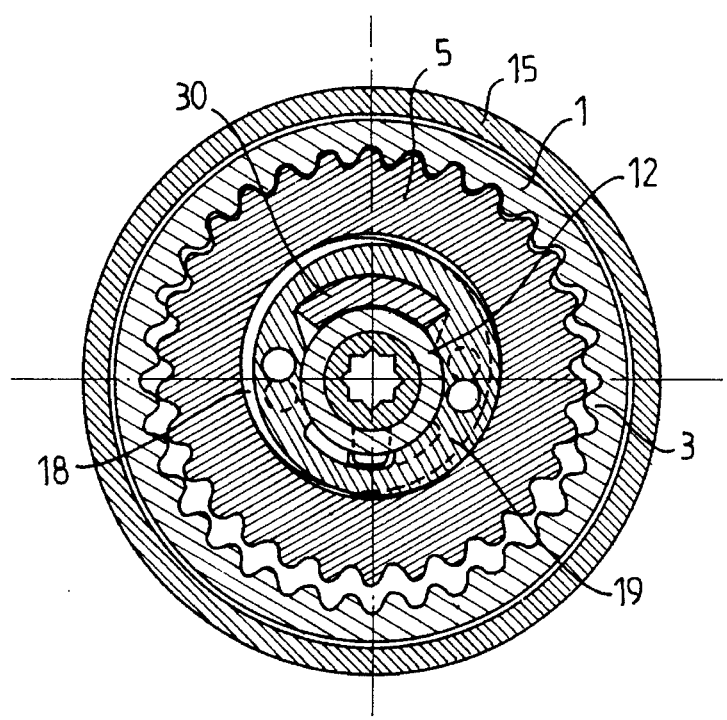
FIG. 6 is a sectional view along line VI—VI of FIG. 5.

In FIGS. 5 and 6, the two discs 18 and 19 bear on semi-cut portions 1a, 8a of flanges 1, 8, axis 120 being guided in these semi-cut portions. The advantage of this solution resides in the fact the discs are directly centered on the flanges and not the axis.

The operation of this articulation mechanism is strictly the same as that previously described.

Figure 7:
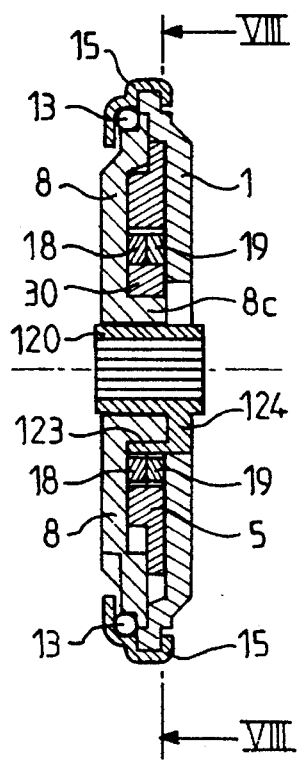
FIG. 7 is a diametrical sectional view of another variant of the satellite driving mechanism.
Figure 8:
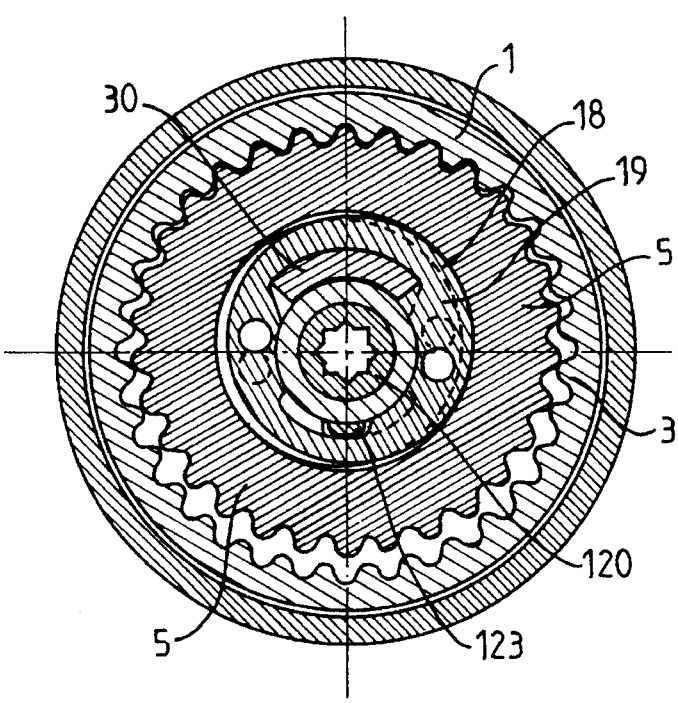
FIG. 8 is sectional view along line VIII—VIII of FIG. 7.

In FIGS. 7 and 8, the two discs 18, 19 bear on the same bearing 8c of a flange, which further improves the centering. Here again, the operation of the mechanism is strictly identical to that previously described.

Figure 9:
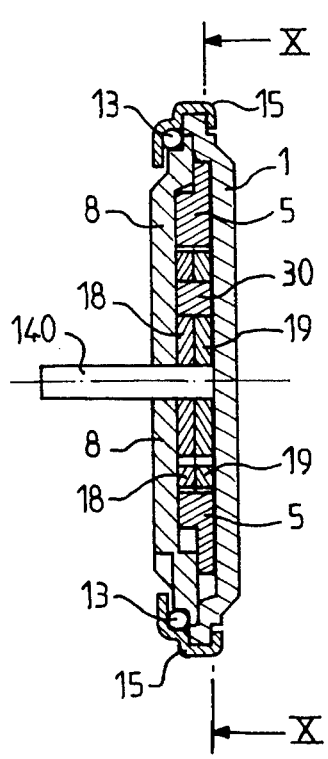
FIG. 9 is a sectional view along line XI—XI of FIG. 10 of the articulation, when being mounted with the assistance of two dip rods.
Figure 10:
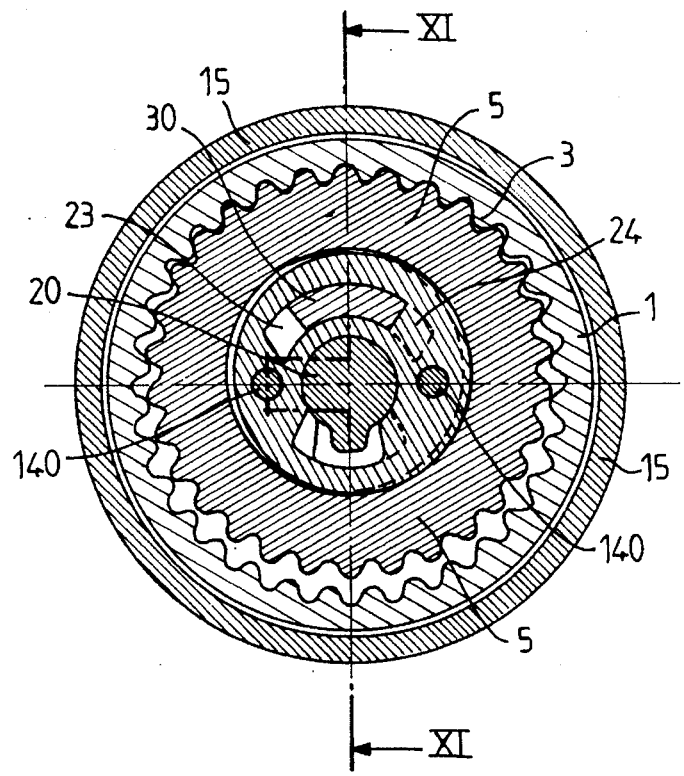
FIG. 10 is a sectional view along line X—X of FIG. 9, when mounting the eccentric in the articulation.

FIGS. 9 and 10 show a mechanism using dip rods 140, one dip rod extending through holes 25 and 27 of the discs, respectively 18 and 19. The other dip rod extends through the holes 26 and 28 of the discs 18 and 19 respectively. This allows the setting in position of this double cam in the recessed portion 5a of satellite 5, in case, of the resilient element being over-compressed.

Figure 11:
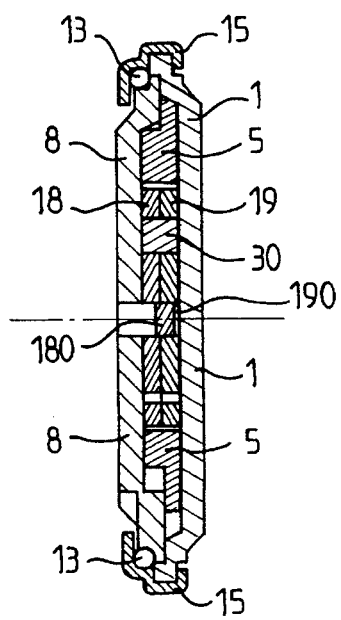
FIG. 11 is a sectional view along line XI—XI of FIG. 10 of the articulation when being mounted with the assistance of semi-cut portions.

In FIG. 11, the dip rods 140 of FIGS. 9 and 10 are replaced by semi-cut portions 180 formed in the disc 18 and engaged in holes 190 of disc 19. When mounted, the semi-cut portions 180 are pressed inside holes 190, and this frees the two discs with respect to one another.

On the other hand, the mounting mechanical members, such as the dip rods or semi-cut portions can be advantageously replaced by a temporary gluing of one disc on the other, whereby this gluing can be removed when the articulation is first used.

We claim:

1. An articulation used in automobile seats, comprising:
   a mobile flange having a mobile flange inner toothing;
   a double satellite;
   a fixed flange having a fixed flange inner toothing for cooperating with said double satellite, the toothings of which mesh on one side with the fixed flange inner toothing of the fixed flange, and on another side with the mobile flange inner toothing of the mobile flange;
   an eccentric acting on the double satellite;
   a driving axis of the eccentric provided with at least one snug, the eccentric being made of two discs angularly mobile with respect to one another, each disc having an arched window; and
   a resilient element, said discs being connected to one another by said resilient element housed in said arched windows, while a central portion of each of said discs is formed with at least one circular recess, extended by a hollow housing adapted for receiving one of said snugs, and wherein each disc is noncircular and housed inside a bore of the double satellite; the two discs, when in a position spaced apart from one another, ensuring a clearance take-up and also an irreversibility of the articulation.

2. An articulation according to claim 1, wherein the two hollow housings of the discs are angularly offset when the two discs are in a position where they are spaced apart from one another, in order that the snug acts first on one disc for unblocking the eccentric, then on the two discs simultaneously.

3. An articulation according to claim 1, wherein each arched window includes, at one end, a recess providing the resilient element with a bearing surface on a single arched opening.

4. An articulation according to claim 1, wherein the connection between the fixed flange and the mobile flange is provided via a crimped ring with interposition between this ring and the mobile flange of a crown made of balls.

5. An articulation according to claim 1, wherein the discs are formed with holes diametrically opposite for each disc and offset angularly by pairs, due to the offsetting of these discs when the resilient element is compressed, the holes allowing the mounting of a control cam provided by the two discs with the assistance of mounting members, when the resilient element is over-compressed.

6. An articulation according to claim 1, wherein the discs are glued onto one another in a mounting position.

7. An articulation according to claim 1, wherein one of the discs includes two semi-cut portions engaged inside holes of the other disc.

8. An articulation according to claim 1, wherein the two discs bear on a bearing rigidly connected to one of the flanges.

9. An articulation according to claim 1, wherein said resilient element is a spring.

* * * * *